United States Patent
Bell et al.

(10) Patent No.: US 9,502,029 B1
(45) Date of Patent: Nov. 22, 2016

(54) CONTEXT-AWARE SPEECH PROCESSING

(75) Inventors: Matthew P. Bell, Sunol, CA (US);
Yuzo Watanabe, Seattle, WA (US);
Stephen M. Polansky, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 451 days.

(21) Appl. No.: 13/531,867

(22) Filed: Jun. 25, 2012

(51) Int. Cl.
*G10L 15/18* (2013.01)
*G10L 15/00* (2013.01)
*G10L 15/22* (2006.01)

(52) U.S. Cl.
CPC ............... *G10L 15/22* (2013.01); *G10L 15/18* (2013.01)

(58) Field of Classification Search
USPC .......................................... 704/235
See application file for complete search history.

(56) References Cited

U.S. PATENT DOCUMENTS

| | | | | |
|---|---|---|---|---|
| 4,885,790 A * | 12/1989 | McAulay et al. | ............ | 704/265 |
| 5,960,394 A * | 9/1999 | Gould et al. | ............... | 704/270.1 |
| 6,061,653 A * | 5/2000 | Fisher et al. | ............... | 704/256.5 |
| 6,076,056 A * | 6/2000 | Huang et al. | .................. | 704/254 |
| 6,260,014 B1 * | 7/2001 | Bahl et al. | ..................... | 704/254 |
| 6,519,562 B1 * | 2/2003 | Phillips et al. | ............... | 704/240 |
| 6,571,210 B2 * | 5/2003 | Hon et al. | ....................... | 704/251 |
| 6,681,206 B1 * | 1/2004 | Gorin et al. | ................... | 704/243 |
| 7,103,542 B2 * | 9/2006 | Doyle | ........................... | 704/231 |
| 7,228,275 B1 * | 6/2007 | Endo et al. | .................... | 704/235 |
| 7,505,905 B1 * | 3/2009 | Zimmerman et al. | ........ | 704/244 |
| 7,860,705 B2 * | 12/2010 | Afify et al. | ....................... | 704/3 |
| 8,069,046 B2 * | 11/2011 | Kennewick et al. | ......... | 704/257 |
| 8,082,153 B2 * | 12/2011 | Coffman et al. | .............. | 704/270 |
| 8,177,643 B2 * | 5/2012 | Watanabe et al. | .............. | 463/40 |
| 8,200,495 B2 * | 6/2012 | Braho et al. | .................... | 704/275 |
| 8,332,218 B2 * | 12/2012 | Cross et al. | .................. | 704/231 |
| 8,352,246 B1 * | 1/2013 | Lloyd | ................................. | 704/9 |
| 8,694,522 B1 * | 4/2014 | Pance | ............... G06F 17/30867 707/706 |
| 8,706,827 B1 * | 4/2014 | Noble et al. | ................... | 709/206 |
| 8,886,524 B1 * | 11/2014 | Watanabe et al. | ............ | 704/225 |
| 8,990,083 B1 * | 3/2015 | Gannu | .................... G10L 15/06 704/240 |
| 9,009,025 B1 * | 4/2015 | Porter | ................... G10L 15/063 704/246 |
| 2002/0087314 A1 * | 7/2002 | Fischer et al. | ................ | 704/255 |
| 2003/0065511 A1 * | 4/2003 | Franco et al. | ................ | 704/243 |
| 2003/0182120 A1 * | 9/2003 | Hwang | ......................... | 704/251 |
| 2003/0236099 A1 * | 12/2003 | Deisher et al. | ............... | 455/522 |
| 2004/0138882 A1 * | 7/2004 | Miyazawa | ..................... | 704/233 |
| 2006/0074656 A1 * | 4/2006 | Mathias | ................ G10L 15/063 704/243 |
| 2006/0149558 A1 * | 7/2006 | Kahn et al. | .................... | 704/278 |
| 2008/0300871 A1 * | 12/2008 | Gilbert | .......................... | 704/233 |
| 2009/0043573 A1 * | 2/2009 | Weinberg et al. | ............ | 704/223 |
| 2009/0055177 A1 * | 2/2009 | Kang et al. | .................... | 704/244 |
| 2010/0161333 A1 * | 6/2010 | Maas | .................... G10L 15/197 704/251 |

(Continued)

*Primary Examiner* — Fariba Sirjani
(74) *Attorney, Agent, or Firm* — Sutherland Asbill & Brennan LLP

(57) ABSTRACT

Described herein are systems and methods for context-aware speech processing. A speech context is determined based on context data associated with a user uttering speech. The speech context and the speech uttered in that speech context may be used to build acoustic models for that speech context. An acoustic model for use in speech processing may be selected based on the determined speech context. A language model for use in speech processing may also be selected based on the determined speech context. Using the acoustic and language models, the speech may be processed to recognize the speech from the user.

20 Claims, 10 Drawing Sheets

(56) References Cited

U.S. PATENT DOCUMENTS

| | | | |
|---|---|---|---|
| 2011/0295590 A1* | 12/2011 | Lloyd | G10L 15/065 704/8 |
| 2011/0295603 A1* | 12/2011 | Meisel | G10L 15/07 704/246 |
| 2012/0053935 A1* | 3/2012 | Malegaonkar | G10L 15/07 704/235 |
| 2012/0078882 A1* | 3/2012 | Boldyrev | G06F 17/30867 707/722 |
| 2012/0158791 A1* | 6/2012 | Kasneci | G06F 17/30958 707/798 |
| 2012/0265528 A1* | 10/2012 | Gruber | G10L 15/18 704/235 |
| 2013/0006633 A1* | 1/2013 | Grokop | G10L 15/063 704/245 |
| 2013/0006634 A1* | 1/2013 | Grokop | G10L 17/10 704/245 |
| 2013/0030804 A1* | 1/2013 | Zavaliagkos | G10L 15/26 704/235 |
| 2013/0060571 A1* | 3/2013 | Soemo et al. | 704/251 |
| 2013/0124449 A1* | 5/2013 | Pinckney | G06F 17/30867 706/52 |
| 2013/0158987 A1* | 6/2013 | Xing | G06F 17/276 704/10 |
| 2014/0018097 A1* | 1/2014 | Goldstein | G06F 19/3406 455/456.1 |
| 2014/0039888 A1* | 2/2014 | Taubman et al. | 704/235 |

* cited by examiner

CONTEXT-AWARE SPEECH PROCESSING

BACKGROUND

Speech provides a convenient way to exchange information. As the prevalence of technology continues to increase, developers of various devices desire ways to improve human communication with those devices. One avenue is to enable the devices to recognize speech, allowing a more natural and convenient way to receive input from users. Speech recognition may involve the use of acoustic and language models to interpret speech into commands, text, and so forth.

Figure 1:
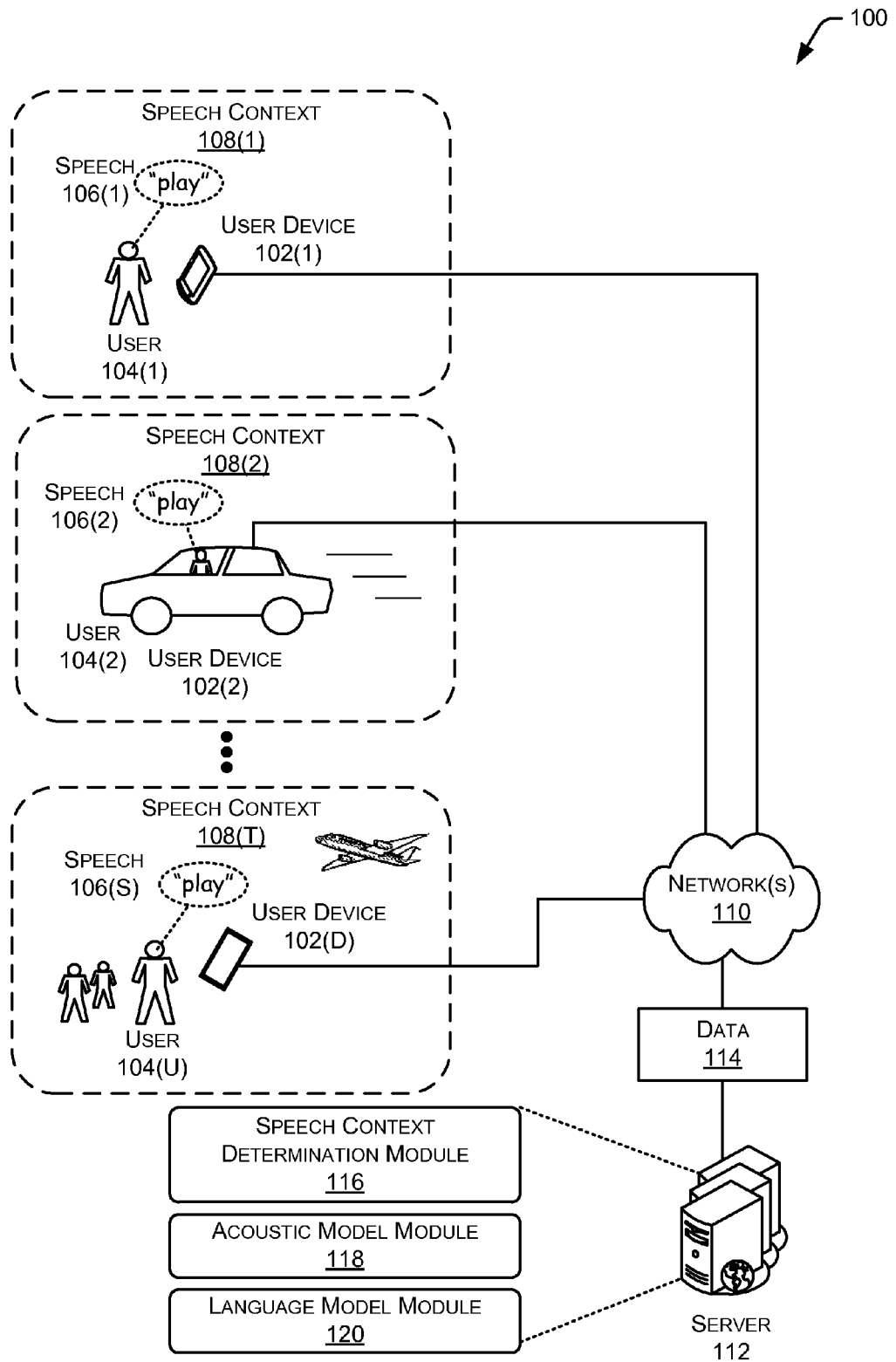
FIG. 1 illustrates a system for determining speech context and using the speech context for speech processing in accordance with an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

Entities such as businesses, governments, and other organizations may use automated speech recognition to receive data from users via spoken input. For example, businesses such as merchants may use speech recognition to take orders from customers, accept customer reviews of goods or services, and so forth.

Speech recognition techniques may use acoustic models and language models. The acoustic model may be used to generate phonemes. Phonemes are sound elements conveying meaning in a spoken language. Acoustic models may be configured to recognize a relatively small number of phonemes, such as the approximately thirty phonemes found in Spanish, or may recognize a large number, such as the more than sixty phonemes used in Japanese. Because of variations in pronunciation, ambient noise, equipment used to receive the speech, and so forth, different acoustic models may provide different levels of accuracy for a given situation.

The language models are used to associate one or more phonemes with particular words, letters, numbers, phrases, or commands to generate text. Language models may vary in size from small models configured to recognize "yes" or "no" to larger models incorporating thousands of words, such as those used for dictation. Because different words, letters, numbers, and so forth may be used in different situations, a particular language model may be selected for use in that situation to improve accuracy, reduce consumption of resources such as processor, memory, power, and so forth.

This disclosure describes systems and methods associated with determining a speech context and processing the speech based at least in part on that speech context. The speech context is based on context data which is used to define a particular set of conditions within which speech is uttered. The context data may be based on user data, application data, environment data, and so forth. The speech context may vary in specificity. For example, a first speech context may be defined as being a speaker of American English in the United States, while a second speech context may be defined as an American English speaker from the Southwest United States speaking via a cellular telephone in an automobile using a hands-free microphone while driving with the air conditioning on. In some implementations, a particular situation may involve two or more speech contexts.

Based at least in part on the one or more speech contexts present during the utterance of speech by the user, various processing may take place. Where an acoustic model has not been previously defined for that speech context, the processing may comprise generating an additional acoustic model. The processing may comprise selecting a previously defined acoustic model based at least in part on the speech context. By generating and selecting an acoustic model appropriate to the speech context, accuracy of the speech recognition is improved, enhancing the user experience.

The processing may also include selecting a previously defined language model based at least in part on the speech context. For example, given the second speech context described above, a language model may be selected suitable for telephone control. By selecting a language model appropriate to the speech context, accuracy of the speech recognition is improved, enhancing the user experience. In some implementations, the processing may include selecting an acoustic model and a language model based on the speech context.

Illustrative System

FIG. 1 illustrates a system 100 for determining speech context and using the speech context for speech processing. One or more user devices 102(1), 102(2), . . . 102(D) may be used by one or more users 104(1), 104(2), . . . 104(U). As used herein, letters enclosed by parenthesis such as "(D)" or "(U)" indicate an integer having a value greater than zero. The user devices 102 may include smartphones, laptop computers, desktop computers, tablet computers, televisions, set-top boxes, game consoles, in-vehicle computer systems, and so forth. The user devices 102 are described below with regard to FIG. 2 in more detail.

The users 104 may utter speech 106 during usage of the user device 102. This speech may comprise one or more words, letters, numbers, portions thereof, or other communicative sounds such as "uh-huh," "hmm," and so forth.

Speech context 108 is indicated here for the user devices 102 and the users 104 uttering speech 106(1), 106(2), . . . , 106(S) in a variety of speech contexts 108(1), 108(2), . . . , 108(T). The speech context 108 is based on context data which is used to define a set of conditions within which speech 106 is uttered. The speech context 108 may vary in specificity. For example, a speech context such as 108(1) may be defined as being a speaker of American English in the United States, while another speech context 108(2) may be defined as an American English speaker from the Southwest United States speaking via a cellular telephone in an automobile using a hands-free microphone while driving with the air conditioning on. In another example, a speech context 108(T) may be a male user at an airport while travelling. The context data may be based on user data, application data, environment data, and so forth. The context data is discussed in more detail below with regard to FIG. 4.

A network 110 couples the user devices 102 to one or more servers 112. The network 110 may comprise one or more private networks, public networks such as the Internet, or a combination of both configured to transfer data between two or more devices. Data 114 may be exchanged between the user devices 102 and the server 112. This data 114 may comprise speech 106, context data, recognized text, and so forth.

The user device 102, the server 112, or both may comprise one or more of a speech context determination module 116, an acoustic model module 118, or a language model module 120. The speech context determination module 116 is configured to use the context data to determine the speech context 108 associated with the speech 106 uttered by the user 104. In one implementation, the speech context determination module 116 may be configured to determine context data associated with conditions contemporaneous with the speech 106 uttered by the user 104 and received by the user device 102. The determining of the context data may include one or more of retrieving user data associated with the user, accessing application data contemporaneous with the utterance, or accessing environmental data associated with the user device, and so forth. For example, geographic location data may be retrieved from the user device 102 or based on information provided by the network 110, such as a location service provided by a wireless wide area network provider.

The speech context determination module 116 may determine correspondence of the context data to one or more previously defined speech contexts 108. For example, based on the geographic location and velocity data provided in the context data, the speech context 108(2) of the user 104(2) in a vehicle may be determined.

As described below, in some implementations, a particular speech context 108 may be new or not previously defined. When the correspondence is below a pre-determined threshold, the speech context determination module 116 may generate an additional speech context 108 based at least in part on the context data. Once generated, this additional speech context 108 may be designated as a current speech context 108. When the correspondence is at or above the pre-determined threshold, the speech context determination module 116 may designate the previously defined speech context 108 as the current speech context 108 based at least in part on the correspondence.

The acoustic model module 118 is configured to provide and select one or more acoustic models for processing the speech 106. The acoustic models are used to convert a waveform which represents the speech 106 in one or more phonemes. The acoustic models may be configured to account for different languages, users 102, environmental noise, equipment used to capture the speech 106, and so forth. The acoustic models are described below in more detail with regard to FIG. 5. Selection of the acoustic models may be based at least in part on the speech context 108. For example, an acoustic model associated with an airport may be used for recognizing speech 106(S) uttered in the speech context 108(T) of an airport.

The language model module 120 is configured to provide and select one or more language models for processing the speech 106. The language models are used to associate one or more phonemes with particular words, letters, numbers, phrases, or commands to generate text. The language models may be configured to account for different languages, lexicons, applications, and so forth. For example, one language model may comprise the relatively few words used to control an entertainment system in a vehicle while another model may comprise the thousands of words used in American English for dictation. The language models are described below in more detail with regard to FIG. 6. Selection of the language models may also be based at least in part on the speech context 108. For example, a language model associated with the entertainment system in the vehicle may be associated with the speech context 108(2) of speech 106(2) uttered by the user 104(2) in the vehicle in motion.

In some implementations, the acoustic model module 118 and the language model module 120 may be used in conjunction with one another to select the acoustic and language models for processing speech 106.

The server 112 may comprise individual servers, groups of servers, cloud resources providing messaging functionality, or a combination thereof. The servers 112 may be configured to provide various functionality such as participating in one or more transactions with the users 104, generating or modifying one or more language models, and so forth.

While various functions are described herein with respect to particular modules or devices, it is understood that these functions may be distributed in many ways across the modules, devices, or both. In one implementation, the speech context determination module 116, the acoustic model module 118, the language model module 120, or the other modules may be executed in whole or in part or otherwise supported by one or more of the servers 112 as accessed via the network 110 or the user devices 102. In another implementation, at least a portion of the speech 106 may be received by the user device 102 and provided to the server 112 for processing.

Figure 2:
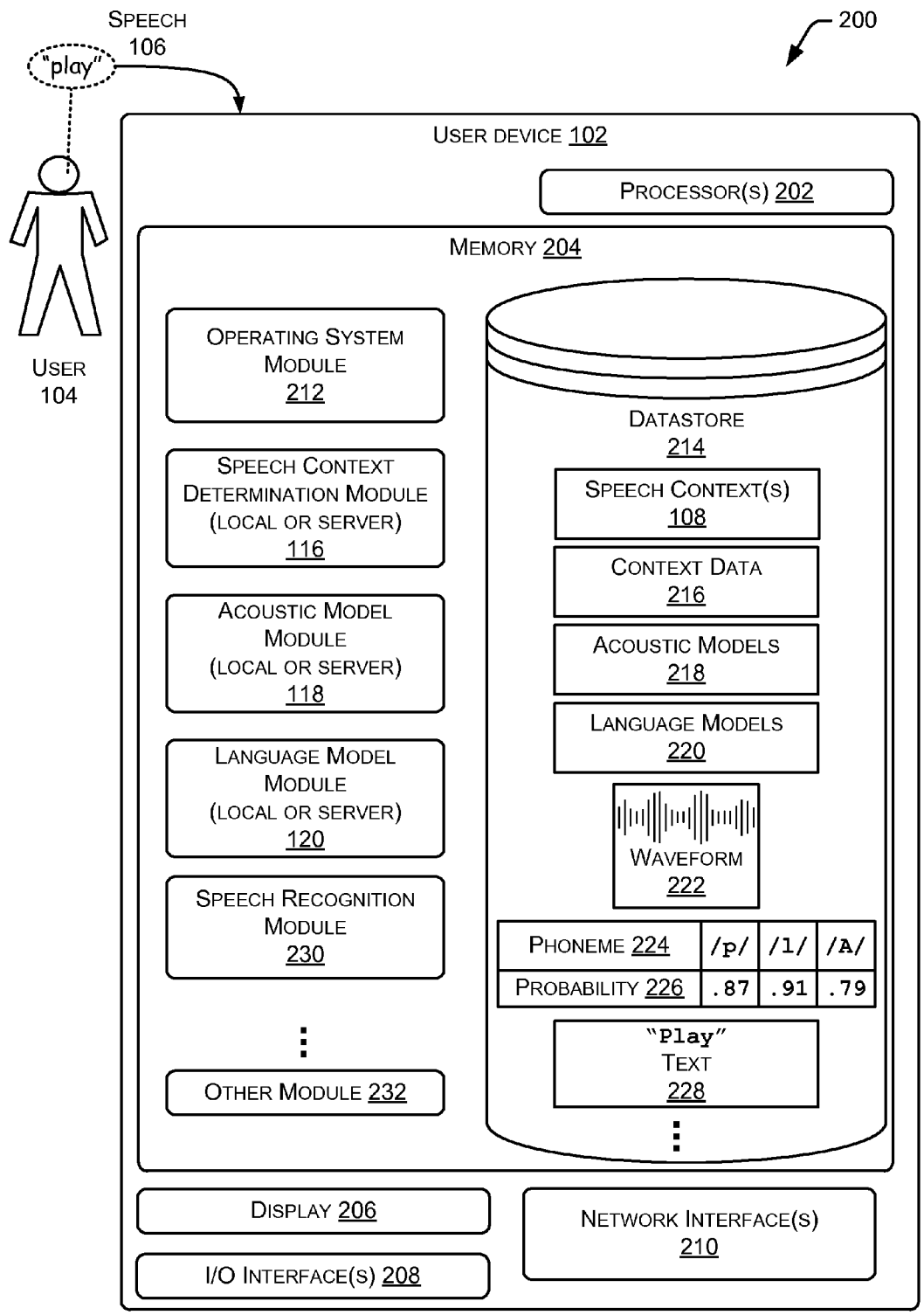
FIG. 2 illustrates a block diagram of a user device configured to determine speech context and provide context-aware processing of the speech in accordance with an embodiment of the disclosure.

FIG. 2 illustrates a block diagram 200 of the user device 102 configured to determine speech context 108 and provide context-aware processing of the speech 106. The user device 102 may comprise one or more processors 202, one or more memories 204, one or more displays 206, one or more input/output ("I/O") interfaces 208, and one or more network interfaces 210.

The processor 202 may comprise one or more cores and is configured to access and execute at least in part instructions stored in the one or more memories 204. In some implementations the processor 202 may comprise a digital signal processor. The one or more memories 204 comprise one or more computer-readable storage media ("CRSM").

The one or more memories 204 may include, but are not limited to, random access memory ("RAM"), flash RAM, magnetic media, optical media, and so forth. The one or more memories 204 may be volatile in that information is retained while providing power or non-volatile in that information is retained without providing power.

The display 206 is configured to present visual information to the user 104. The one or more I/O interfaces 208 may also be provided in the user device 102. These I/O interfaces 208 allow for coupling devices, such as keyboards, external memories, and so forth, to the user device 102.

The one or more network interfaces 210 provide for the transfer of data between the user device 102 and another device, such as via the network 110. The network interfaces 210 may include, but are not limited to, wired local area networks ("LANs"), wireless local area networks ("WLANs"), wireless wide area networks ("WWANs"), and so forth.

The one or more memories 204 may store code or program instructions for execution by the processor 202 to perform certain actions or functions. These instructions may include an operating system module 212 configured to manage hardware resources such as the I/O interfaces 208 and provide various services to applications executing on the processor 202. The one or more memories 204 may also store a datastore 214 containing information about the operating system module 212, previously defined speech contexts 108, context data 216, acoustic models 218, language models 220, waveforms 222 encoding the speech 106, phonemes 224, associated probabilities 226, text 228, and so forth.

The context data 216 may be based on user data, application data, environment data, and so forth and is described in more detail below with regard to FIG. 4. The acoustic models 218 comprise one or more acoustic models associating waveforms or portions thereof to particular phonemes 224 and an associated probability or weight 226 as to the confidence of the particular phonemes 224. The acoustic models 218 are discussed below in more detail with regard to FIG. 5.

The language models 220 are used to associate one or more phonemes 224 with particular words, letters, numbers, phrases, or commands to generate the text 228. In some implementations, the probability 226, adjacent phonemes 224 in a waveform 222, and so forth may be used to generate the text 228.

One or more of the speech context determination module 116, the acoustic model module 118, or the language model module 120 may be stored in the memory 204. These modules may be configured to operate independently or in conjunction with modules on the server 112.

A speech recognition module 230 may also be stored in the memory 204. The speech recognition module 230 may be configured to use one or more speech contexts 108, one or more acoustic models 218, and one or more language models 220 to generate the text 228 from the waveform 222.

For example, a user interface module may be configured to accept user input and generate output on the display 206, a messaging module may be configured to provide email functionality, and so forth.

Figure 3:
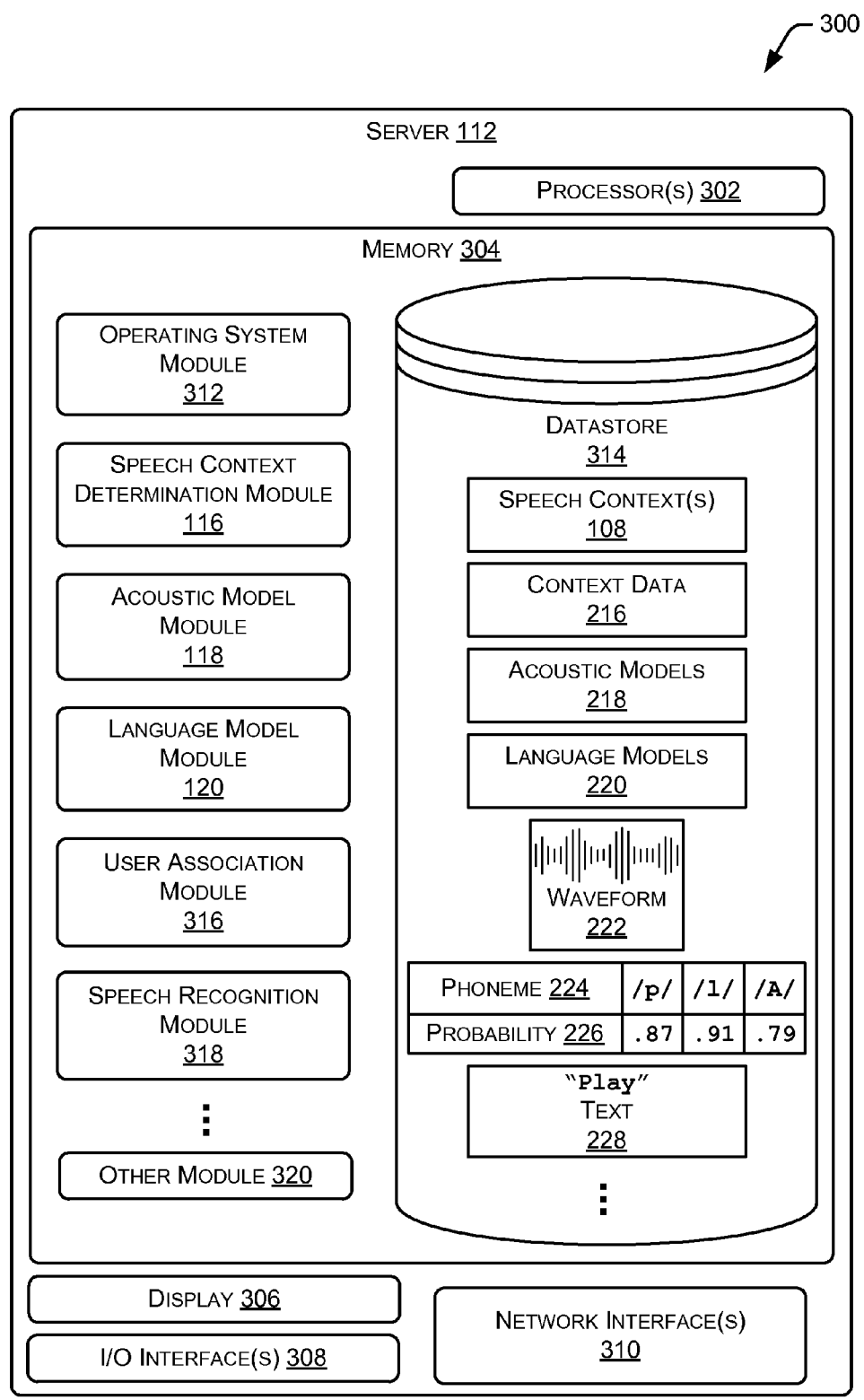
FIG. 3 illustrates a block diagram of a server configured to determine speech context and provide context-aware processing of the speech in accordance with an embodiment of the disclosure.

FIG. 3 illustrates a block diagram 300 of the server 112 configured to determine the speech context 108 and provide context-aware processing of the speech 106. The server 112 may comprise one or more processors 302, memories 304, displays 306, I/O interfaces 308, or network interfaces 310 similar to those described above with regard to FIG. 2. The memory 304 may also include an operating system module 312 and a datastore 314. The datastore 314 may contain information about the operating system module 312, previously defined speech contexts 108, the context data 216, the acoustic models 218, the language models 220, the waveforms 222 encoding the speech 106, the phonemes 224, the associated probabilities 226, the text 228, and so forth. The datastore 314 may store other data, such as accuracy ratings for the models, performance data of the models, and so forth. In some implementations, due to additional resources available on the server 112, the modules, data, and models available on the server 112 may be more comprehensive, larger, or more complicated than those available on the user device 102.

The memory 304 may also include the acoustic model module 118, the language model module 120, or both, as described above. In some implementations these modules may differ from those on the user device 102 in terms of complexity, size, processor utilization, and so forth. For example, the acoustic model module 118 or the language model module 120 may be configured to execute in a distributed fashion across a plurality of servers 112.

A user association module 316 may be configured to associate a particular user 104 with particular speech contexts 108, acoustic models 218, language models 220, and so forth. For example, an acoustic model 218 may be tailored for the user 104(2) in the speech context 108 of the moving vehicle.

A speech recognition module 318 may also be stored in the memory 304. As described above, the speech recognition module 230 may be configured to use one or more of the speech contexts 108, the acoustic models 218, or the language models 220 to generate the text 228 from the waveform 222.

Other modules 320 present in the server 112. For example, a merchant transaction module may acquire data about transactions such as purchases or rentals of goods or services for use by the speech context determination module 116 to determine the speech context 108.

Figure 4:
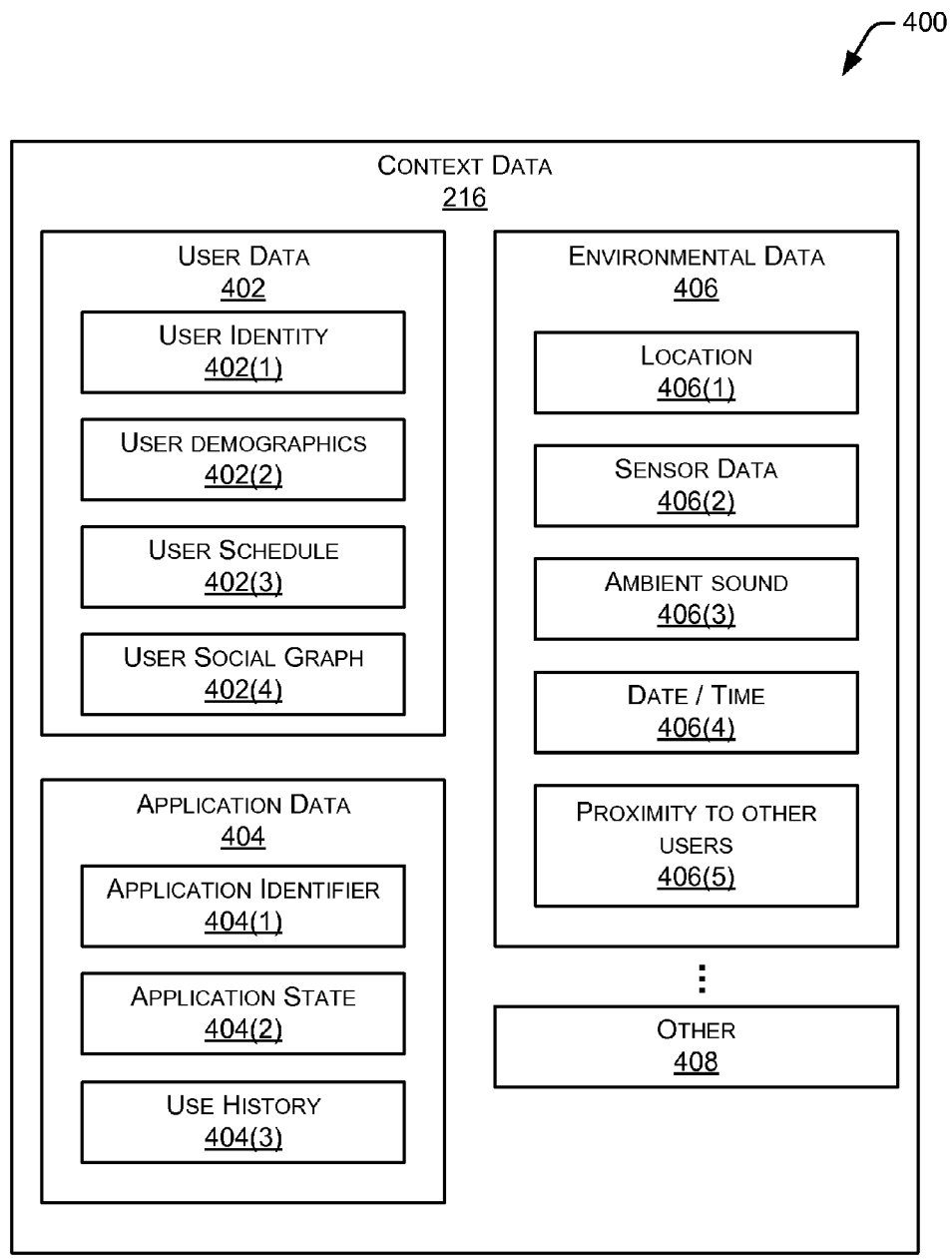
FIG. 4 illustrates a block diagram of context data which may be considered to determine speech context in accordance with an embodiment of the disclosure.

FIG. 4 illustrates a block diagram 400 of the context data 216 which may be used by the speech context determination module 116 to determine the speech context 108. The context data 216 may be retrieved from the user device 102, based on information about the user device 102 or the user 104, and so forth. The user 104 may configure what context data 216 will be collected, determined, or used.

The context data 216 may comprise information which, for the sake of illustration, may be grouped into three categories: user data 402, application data 404, and environmental data 406. The user data 402 provides information associated with the user 104. This data may include a user identity 402(1), user demographics 402(2), user schedule 402(3), user social graph 402(4), and so forth. The user identity 402(1) provides information about who the user 104 is. This may be a real identification, such as provided by a login or biometric identification indicating that the user 104(1) is John Q. Adams. In other implementations, the identification may be anonymous, such as distinguishing user 104(1) from user 104(2), but not providing a connection to their real identities. The user identity 402(1) may be used in some implementations to provide user-specific speech contexts 108.

The user demographics 402(2) provide information classifying or relating the user 104 with particular groups or types. For example, the user demographics 402(2) may indicate age, years of education, place of residence, and so forth. For example, the speech context 108 describing the user 104 as a resident of Boston, Mass., may result in an initial selection of acoustic models 218 and/or language models 220 tuned for the regional accent.

The user schedule 402(3) encompasses information describing the user's calendar, to-do lists, planned activities, outstanding engagements, and so forth. For example, the user schedule 402(3) may indicate that on a particular date and time the user 104(U) is scheduled to travel via airplane. This information may be used at least in part to determine the speech context 108(T) is that of an airport. In some implementations, the schedule information may contain location or other information which may be used to determine the speech context. For example, information about a train reservation may be used to infer that the speech context 108 is on board a train.

The user social graph 402(4) establishes social, professional, or familial relationships between users 104. This information may be used to determine speech context 108. For example, where the user 104(1) is indicated as being related to the user 104(2), the speech contexts 108 associated with the particular user 104(1) may be initially associated and used by the user 104(2).

The application data 404 provides information about one or more applications or modules including the operating system executing on the user device 102 or the server 112. For example, where the speech context 108 indicates the application executing is a messaging client, the language model 220 may be selected for dictation. In comparison, when the application executing is a music player, the speech context 108 may call for a smaller language model 220 comprising commands associated with the music player.

The application data 404 may include an application identifier 404(1), application state 404(2), use history 404(3), and so forth. The application identifier 404(1) may be used to indicate a particular application, version, and so forth of an executing application. For example, the application identifier 404(1) may indicate that the messaging client comprises an XYZ Corporation mail client version 2.3. The application state 404(2) may comprise information about the operation of the application; for example, whether the user is entering application commands or dictating text for an email. The use history 404(3) comprises data such as dates, times, and so forth about the application. For example, the user sends and receives email messages from 7:11 a.m. to 8:09 a.m. during weekdays. The application data 404 may thus be used to determine the speech context 108, such as being on the train and dictating work emails, and so forth.

Other application data 404 may be used, such as whether the application calls for short form speech or long form speech. For example, a short messaging service ("SMS") application or a user interface may call for short form speech, compared to a word processing application configured to accept longer form text such as a letter or novel.

The environmental data 406 describes the setting in which the user device 102 and presumably the user 104 are present during utterance of the speech 106. This information may include location 406(1). The location 406(1) may comprise data about relative locations (such as in the user's 104 office) or geographic locations (or "geolocation" such as latitude and longitude). The location 106(1) may be determined based on data acquired from a global positioning system ("GPS") receiver coupled to the user device 102, from data provided by the server 112 such as a cellular data carrier, from analysis of network attributes such as associating an internet protocol address with a geolocation, and so forth. The location 406(1) may be used to determine the speech context 108, for example by, indicating that the user 104 is at an office building. The location 406(1) information may also include information such as relative speed, altitude, and so forth. For example, the GPS receiver may provide information such as the device is travelling at a sustained 110 miles per hour, indicating that the user device 102 and the user 104 are in the speech context 108 of a moving train.

The environmental data 406 may include sensor data 406(2) acquired from one or more sensors in the user device 102. The sensors may include accelerometers, gyroscopes, cameras, light sensors, thermometers, and so forth. For example, ambient light data indicating bright light above a pre-determined flux may indicate that the user device 102 is outdoors. Ambient sound 406(3) may be detected by a microphone. For example, the speech context 108 may be determined based on the "white noise" sound of an air conditioning unit operating. In some implementations, a microphone type or characteristics of the microphone may be accounted for, such as the directionality, frequency response, near-field performance, far-field performance, and so forth.

Date, time 406(4) or both may be used to determine the speech context 108. For example, the date/time 406(4) of particular occurrences of application data 404 or other environmental data 406 may be used to establish the speech context 108, such as the morning commute by train of the user 104.

The environmental data 406 may also include data about or obtained from other devices, such as the proximity to other users 406(S) or user devices 102. For example, the presence of a large number of user devices 102 in a common stationary location may be used to establish the speech context 108 as being a crowded room.

The context data 216 may also include other 408 data, such as, for example, transaction data such as goods or services purchased by the user 104, identity of other devices the user device 102 has coupled to such as access points, computers, servers, type of data connection, and so forth. For example, the presence of a WLAN access point compared to a WWAN connection may be used to determine the speech context 108.

The various pieces of context data 216 may be used independently or in combination with one another to determine the speech context 108. For example, the speech context determination module 116 may be configured to determine the speech context based at least in part on the user identity 402(1), the application identifier 404(1), the location 406(1), and the date/time 406(4).

Figure 5:
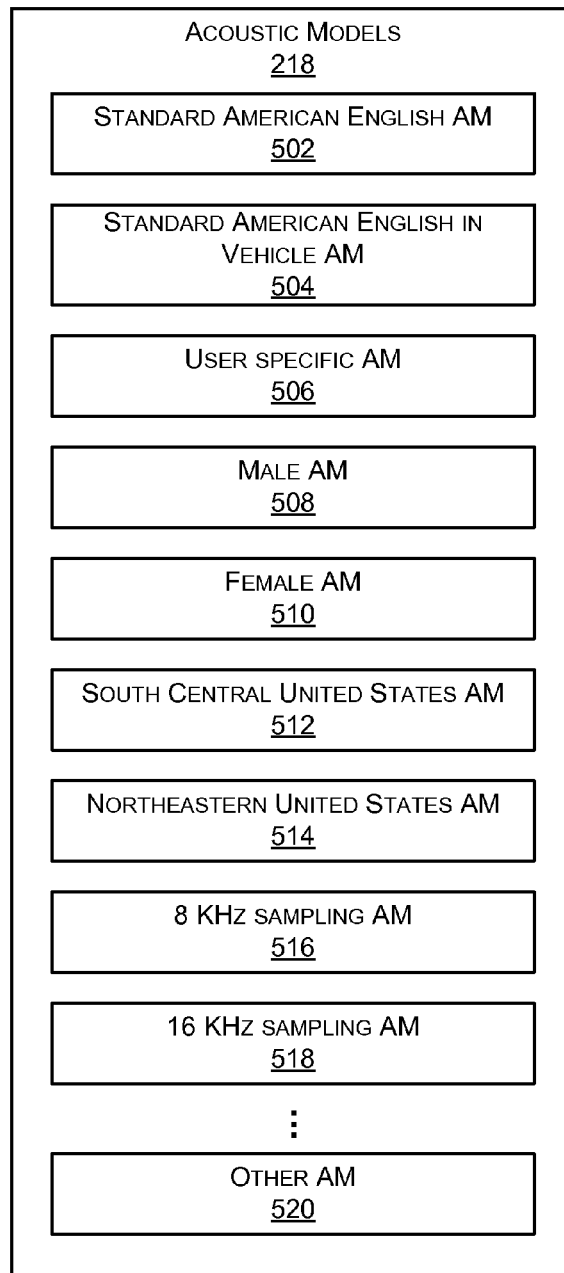
FIG. 5 illustrates several acoustic models which may be associated with different speech contexts in accordance with an embodiment of the disclosure.

FIG. 5 illustrates several 500 acoustic models 218 which may be associated with different speech contexts 108. As described above, the acoustic models 218 are configured to associate a waveform 222 with one or more phonemes 224. The acoustic models 218 may be configured to operate in particular speech contexts 108. As described above, the acoustic model 218 may be selected by the acoustic model module 118 based at least in part on the speech context 108 provided by the speech context determination module 116. Creation of an acoustic model may be based on hours, minutes, or days worth of waveforms 222. For example, an acoustic model 218 may be initially generated from hundreds of hours of waveforms 222. Once generated, the acoustic model 218 may be further enhanced by using additional data.

The following acoustic models 218 are discussed for illustration, and not limitation. An acoustic model for standard American English 502 may be provided for general use. A standard American English in a vehicle 504 may also be provided tailored for operation in the audio environment present in a moving vehicle. A user specific 506 acoustic model may be configured for a particular user 104, such as the user 104(1), generated as discussed below with regard to FIG. 8. Acoustic models may be provided for males 508 and females 510. Acoustic models may be generated which are specific to regional accents, such as for speakers from the south central United States 512 or the northeastern United States 514.

Acoustic models 218 may also be tailored for particular audio sampling rates used to generate the waveforms 222. As shown here, acoustic models for an 8 KHz sampling 516 and a 16 KHz sampling 518 are shown here. Due to differences in the sampling rates, the waveforms 222 may vary, thus an acoustic model 218 tailored for a particular sampling rate may result in improved processing of the speech 106. Other acoustic models 520 may be provided.

The acoustic model 218 may provide for various combinations. For example, an acoustic model 218 may be configured for a male speaker from the south central United States in a vehicle and sampled at 8 KHz. In another example, the acoustic model 218 may be tailored for a female Spanish speaker sampled at 16 KHz in an airport.

Figure 6:
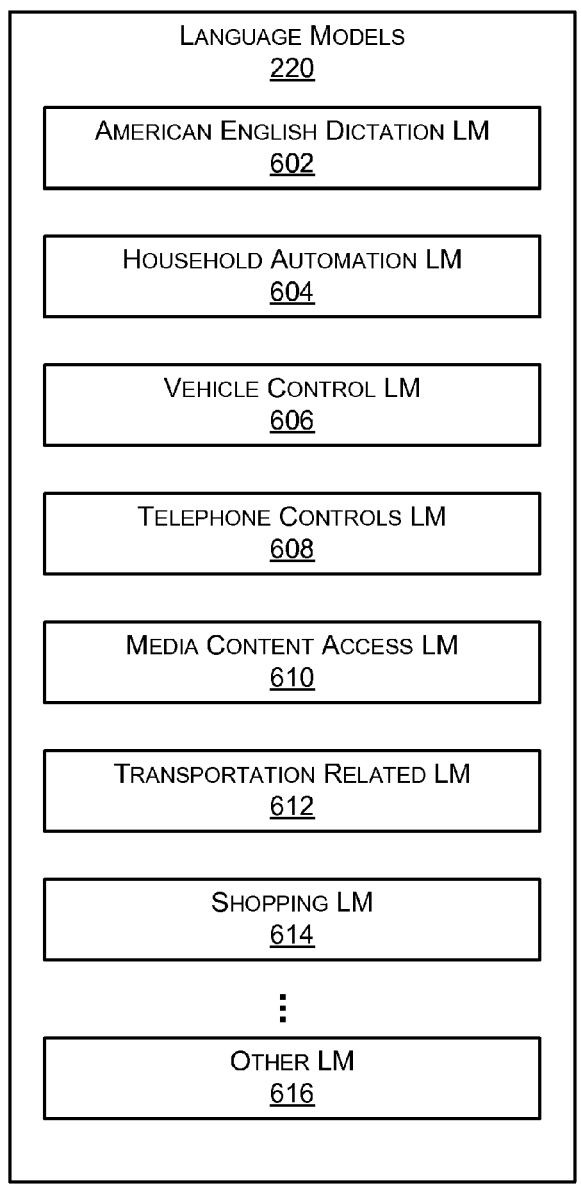
FIG. 6 illustrates several language models which may be associated with different speech contexts in accordance with an embodiment of the disclosure.

FIG. 6 illustrates several 600 language models 220 which may be associated with different speech contexts 108. As described above, the language models 220 are used to associate one or more phonemes 224 with particular words, letters, numbers, phrases, or commands to generate the text 228. The size and complexity of these language models 220 may vary such that each may be configured for use in one or more particular speech contexts 108. As described above, the language model 220 may be selected by the language model module 120 based at least in part on the speech context 108 provided by the speech context determination module 116. The language models 220 may utilize unigram, bigram, trigram, or n-gram, positional, or other models.

An American English dictation module 602 may provide a large lexicon of words, such as 40,000 words for basic American English. In comparison, a household automation 604 language model may comprise 200 words for configuring and operating appliances in the user's 104 home. A vehicle control 606 language model may be provided for directing operations such as controlling an in-vehicle entertainment system, environmental controls such as heat and air conditioning, navigation, and so forth. Other language models may be provided for telephone controls 608 to control placement and operation of telephone calls. A media content access 610 language model may be configured to control a music or video playback. A transportation related 612 language model may contain words and commands associated with making and maintaining arrangements for travel by airline, train, automobile, and so forth. A shopping language model 614 is may contain words and commands associated with shopping, such as in a bricks and mortar store, with an online merchant, and so forth. Other 616 language models may also be provided, such as medical, equipment maintenance, and so forth.

Illustrative Process

Figure 7:
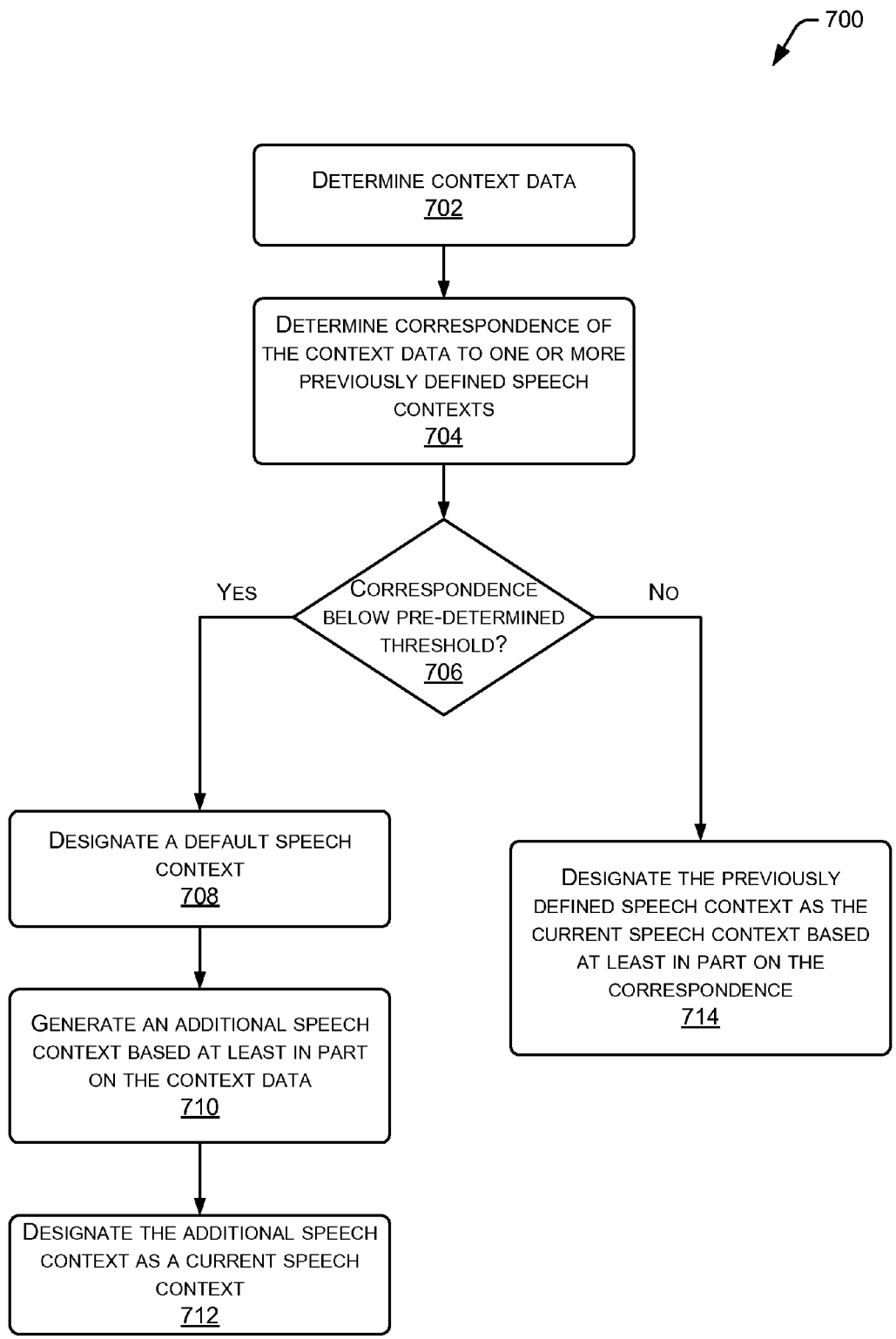
FIG. 7 illustrates a flow diagram of a process of determining a speech context in accordance with an embodiment of the disclosure.

FIG. 7 illustrates a flow diagram 700 of a process of determining the speech context 108 based at least in part on the context data 216. This process may be implemented at least in part by the speech context determination module 116 on the user device 102, the server 112, or a combination thereof.

Block 702 determines the context data 216 associated with conditions contemporaneous with the speech 106 uttered by the user 104 and received by the user device 102. As described above, in some implementations, the determination may comprise one or more of retrieving the user data 402 associated with the user, accessing the application data 404, or accessing the environmental data 406 associated with the user device 102.

Block 704 determines correspondence of the context data 216 to one or more previously defined speech contexts 108. For example, the speech context determination module 116 may determine that the speech context 108(1) has a high correspondence with a particular user identity 402(1), application identifier 404(1), location 406(1), and date/time 406(4).

As described above, the context data 216 may comprise one or more of the user data 402, the application data 404, the environmental data 406, or other data 408. The user data 402 may include one or more of the user identity 402(1), the user demographics 402(2), the user schedule 402(3), the user social graph 402(4), or other information associated with or particular to the user 104. The application data 404 may include one or more of the application identifier 404(1) of an application executing on the user device 102, the application state 404(2), the use history 404(3) of the application on the user device, or other information. The environmental data 406 may include one or more of the user device location 406(1), the sensor data 406(2), the ambient sound 406(3), the date/time 406(4), the proximity to other users 406(5), or other information. The context data 216 may also comprise other 408 data.

In some implementations, block 706 determines when the correspondence is below a pre-determined threshold. When the correspondence is below the pre-determined threshold, the process may proceed to block 708. Block 708 designates a default speech context for use. The default context may be designated to provide initial functionality. For example, the default context may comprise an "individual user in a quiet room." Block 710 generates an additional speech context 108 based at least in part on the context data 216. For example, where the user is a female with a Spanish accent speaking British English on a subway train, an additional speech context 108 may be generated. In some implementations, the additional speech context 108 may be generated based at least in part from a previously defined speech context 108. Continuing the example, a speech context 108 for an above-ground train may be deemed similar enough to be used as an initial template for the subway train.

Block 712 designates the additional speech context 108 as a current speech context 108. This designation may comprise using another previously defined speech context such as the default speech context 108 until acoustic models 218, language models 220, and so forth can be built or associated with the additional speech context 108.

When at block 706 the correspondence is at or above the pre-determined threshold, the process proceeds to block 714. Block 714 designates one or more of the previously defined speech contexts 108 as the current speech contexts 108 based at least in part on the correspondence. For example, based on the high correspondence between the context data 216 and the speech context 108(2), the speech context 108(2) may be selected for processing speech 106.

Figure 8:
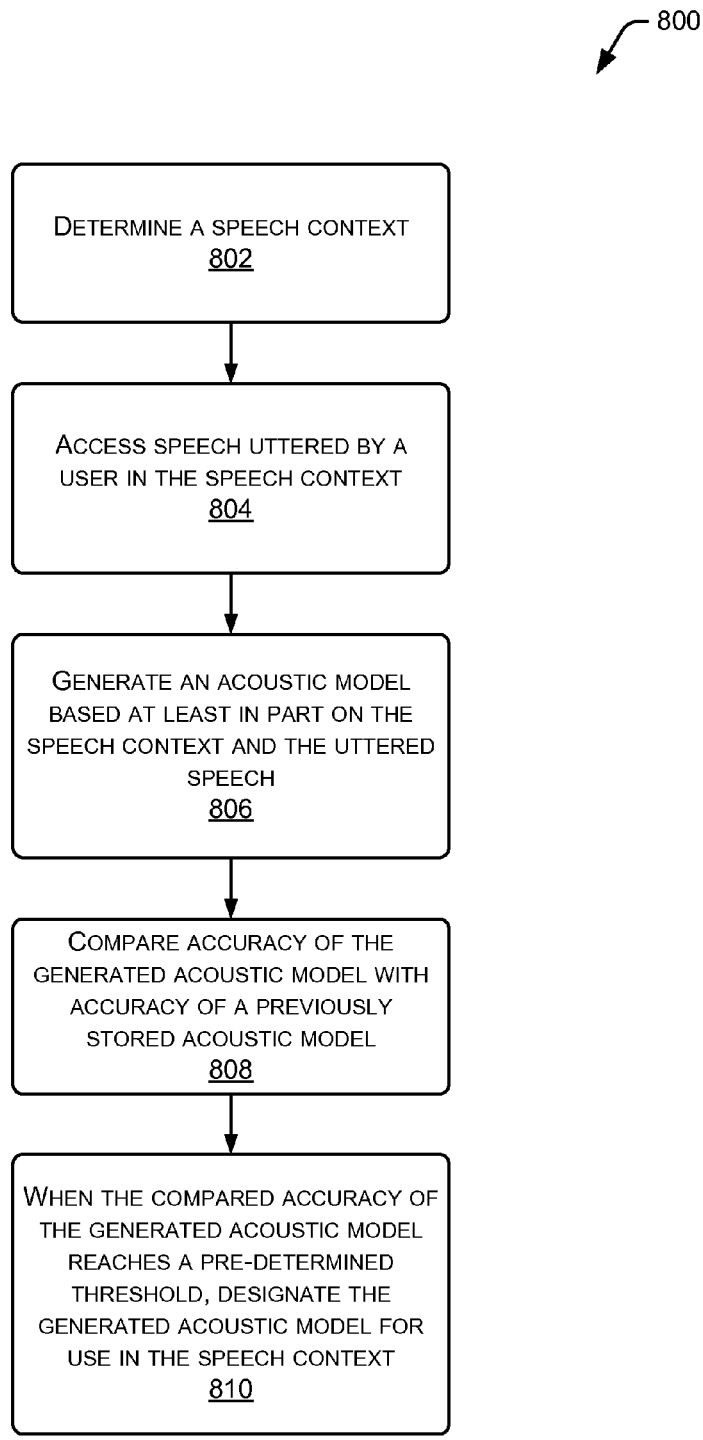
FIG. 8 illustrates a flow diagram of a process of generating an acoustic model for a particular speech context in accordance with an embodiment of the disclosure.

FIG. 8 illustrates a flow diagram 800 of a process of generating an acoustic model 218 for a particular speech context 108. As usage of user devices 102 evolves, and as the environments in which the users 104 find themselves with those user devices 102 continue to change, additional acoustic models 218 may be generated. For example, as automobiles transition from internal combustion to electric operation, a corresponding change in the ambient noise environment within the vehicles may change. As a result of this change in the speech context 108, an additional acoustic model 218 may be generated. The acoustic model module 118 may provide this functionality based at least in part on the speech context 108 provided by the speech context determination module 116.

Block 802 determines the speech context 108. In some implementations, this may comprise the process described above with regard to FIG. 7. As described above, a plurality of speech contexts 108 may occur simultaneously.

Block 804 accesses speech 106 uttered by the user 104 in the speech context 108. For example, the waveform 222 may be retrieved from the datastore 214 or 314.

Block 806 generates one or more acoustic models 218 based at least in part on the current speech context 108 and the uttered speech 106 received by the user device 102. These acoustic models 218 may be generated by acquiring waveforms 222 from one or more users 104 in the speech context 108 over a period of time, or until a pre-determined amount of speech 106 has been sampled.

In some implementations these acoustic models 218 may be associated with a specific user 104. One or more previously stored acoustic models 218 may be accessed and updated based at least in part on the one or more current speech contexts 108 and the uttered speech 106. For example, where the speech context 108 has undergone a change, the associated previously stored acoustic model 218 may be updated to reflect that change.

In some implementations, block 808 may be employed to compare accuracy of the one or more generated acoustic models 218 with accuracy of a previously stored acoustic model 218. For example, this comparison may be done to determine when the generated acoustic model 218 more accurately determines the phonemes 224 of uttered speech. Block 810 determines when the compared accuracy of the generated acoustic model 218 reaches a pre-determined threshold. When the pre-determined threshold is reached, the generated acoustic model 218 is designated for use in the current speech context 108. For example, the previously stored acoustic model 218 may be used until the accuracy of the one or more generated acoustic models 218 meets or exceeds the accuracy of the previously stored acoustic model 218. In this implementation, the previously stored acoustic model 218 may remain in use while generating the additional acoustic model 218, allowing the user 104 to experience at least some functionality.

In some implementations multiple acoustic models 218 may be used contemporaneously. For example, the waveforms 222 may be processed using the male acoustic model 508 and the 8 KHz sampling acoustic model 516. The multiple acoustic models 218 may be combined for use jointly, or be used separately for processing in parallel.

Figure 9:
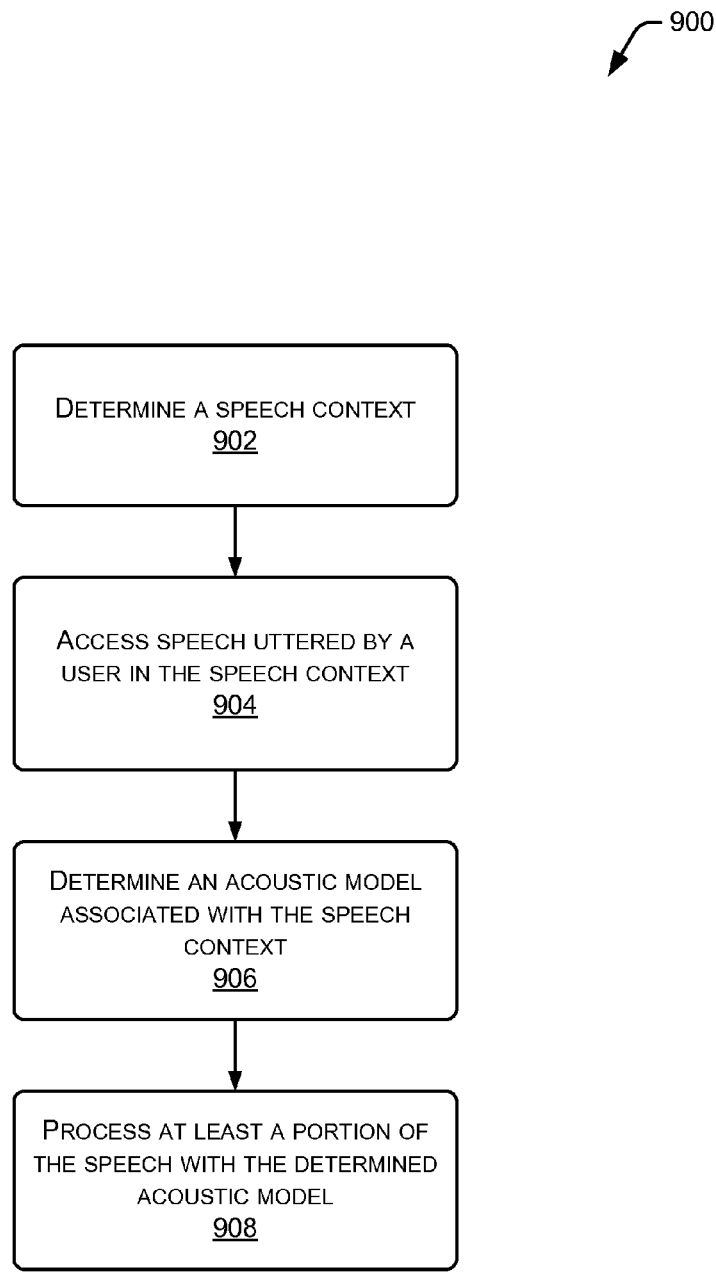
FIG. 9 illustrates a flow diagram of a process of determining an acoustic model for processing speech based on the speech context in accordance with an embodiment of the disclosure.

FIG. 9 illustrates a flow diagram 900 of a process of determining an acoustic model 218 for processing speech 106 based on the speech context 108. As described above, a particular acoustic model 218 corresponding to a particular speech context 108 may result in improved accuracy in generating text 228. This improved accuracy enhances the user experience. The acoustic model module 118 may provide this functionality based at least in part on the speech context 108 provided by the speech context determination module 116.

Block 902 determines the one or more current speech contexts 108. In some implementations, this may comprise the process described above with regard to FIG. 7.

Block 904 accesses speech 106 uttered by the user 104 in the one or more current speech contexts 108. For example, the waveform 222 may be retrieved from the datastore 214 or 314.

Block 906 determines one or more acoustic models 218 based at least in part on the one or more current speech contexts 108. For example, one of the previously stored acoustic models 218 may correspond to the current speech context 108.

Block 908 processes the speech 106 with the one or more determined acoustic models 218. This processing may include determining one or more phonemes 224 within the speech 106. As described above, accuracy in determining the one or more phonemes 224 may be improved with one or more acoustic models 218 corresponding to the speech context 108.

Figure 10:
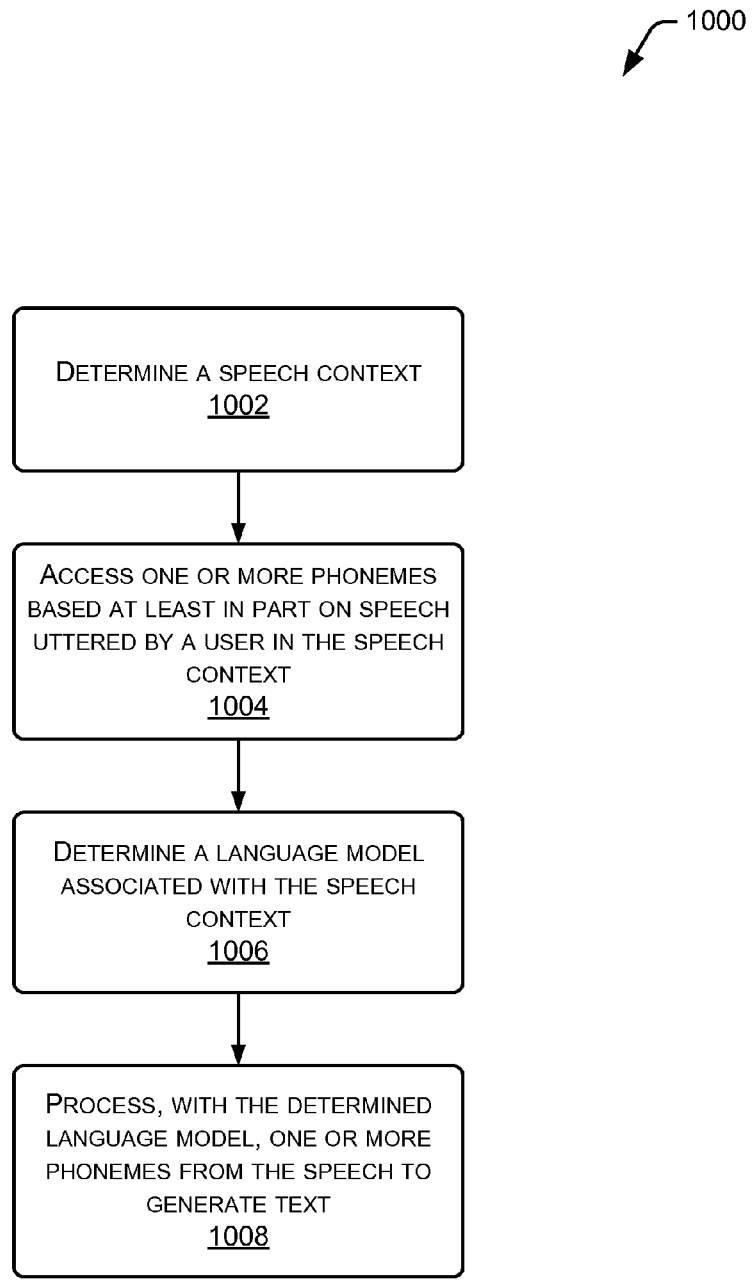
FIG. 10 illustrates a flow diagram of a process of determining a language model for processing speech based on the speech context in accordance with an embodiment of the disclosure.

FIG. 10 illustrates a flow diagram 1000 of a process of determining the language model 220 for processing speech 106 based at least in part on the speech context 108. By selecting a particular language model 220 for use, accuracy may be improved. For example, when the speech context 108 comprises vehicle controls, the smaller vehicle control 606 language model may provide more accurate output than the American English dictation 602 language model. Furthermore, selection of a particular language model 220 may reduce resource consumption on one or more of the user devices 102, the servers 112, or the networks 110. The language model module 120 may provide this functionality based at least in part on the speech context 108 provided by the speech context determination module 116.

Block 1002 determines the one or more speech contexts 108. In some implementations, this may comprise the process described above with regard to FIG. 7.

Block 1004 accesses one or more phonemes of the speech 106 uttered by the user 104 in the one or more speech contexts 108. For example, the waveform 222 may be retrieved from the datastore 214 or 314.

Block 1006 determines one or more language models 220 associated with the one or more current speech contexts 108. For example, based upon the presence of the user device 102 in a vehicle, the speech context 108(2) may be determined, to which the vehicle control 606 language model is associated. In some implementations, a plurality of language models 220 may be used to process the waveform 222.

In some implementations multiple language models 220 may be used contemporaneously. For example, the phonemes 224 may be processed using the media content access language model 610 and the shopping language model 614 when the user is listening to music and shopping. The multiple language models 220 may be used jointly, or for separate processing in parallel.

Block 1008 processes, with the determined one or more language models 220, one or more phonemes 224 of the speech 106 to generate text 228. For example, the one or more phonemes 224 from the speech 106(2) uttered by the user 104(2) in the vehicle may be processed with the vehicle control 606 language model. As described above, in some implementations, the one or more speech contexts 108 may also be used to determine the one or more acoustic models 218 used to generate the one or more phonemes 224.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. One or more non-transitory computer-readable media storing computer-executable instructions that, when executed by at least one processor, configure the at least one processor to perform operations comprising:
    determining context data associated with conditions contemporaneous with speech uttered by a user and received by a user device, the determining comprising retrieving social graph data associated with the user, or accessing social graph data from the user device;
    determining a correspondence of the context data to one or more previously defined speech contexts for processing speech;
    when the correspondence is below a pre-determined threshold:
        generating an additional speech context using the context data; and
        designating the additional speech context as a current speech context; and
    when the correspondence is at or above the pre-determined threshold, designating one of the previously defined speech contexts as the current speech context;
    acquiring speech waveforms over a period of time or until a pre-determined amount of acquired speech waveforms has been acquired, wherein the acquired speech waveforms correspond to speech that is spoken in the conditions corresponding to the context data;
    generating, using the acquired speech waveforms, an acoustic model for processing waveforms representing speech that is spoken in the conditions to determine one or more phonemes, wherein the waveforms are different from the acquired speech waveforms used to generate the acoustic model;
    comparing accuracy of the acoustic model with accuracy of a previously stored acoustic model;
    when the compared accuracy of the acoustic model reaches a pre-determined threshold, designating the acoustic model for use in the current speech context;
    determining a language model associated with the current speech context; and
    processing, with the language model, one or more phonemes from the speech that is spoken in the conditions to generate text.

2. The computer-readable media of claim 1, the context data further comprising one or more of user data, application data, or environmental data.

3. The computer-readable media of claim 1, the instructions further comprising:
    processing the speech that is spoken in the conditions using the acoustic model to determine the one or more phonemes.

4. The computer-readable media of claim 1, the instructions further comprising:
    processing the speech that is spoken in the conditions with the acoustic model to determine one or more phonemes;

determining a language model associated with the current speech context; and processing the one or more phonemes with the language model to generate text.

5. A method comprising:

determining social graph data associated with speech received by a user device in at least one condition;

determining that a correspondence of the social graph data to one or more previously defined speech contexts is below a pre-determined threshold, and designating one of the previously defined speech contexts as a current speech context;

when the correspondence is below a pre-determined threshold:

generating an additional speech context using the social graph data; and designating the additional speech context as a current speech context;

acquiring speech waveforms at least one of over a period of time or until a pre-determined amount of speech waveforms has been acquired, wherein the acquired speech waveforms correspond to speech of one or more users that is spoken in the at least one condition associated with the social graph data; and generating, using the acquired speech waveforms, an acoustic model for processing the speech waveforms representing speech that is spoken in the at least one condition to determine one or more phonemes, wherein the speech waveforms are different from the acquired speech waveforms used to generate the acoustic model;

comparing accuracy of the acoustic model with accuracy of a previously stored acoustic model;

when the compared accuracy of the acoustic model reaches a pre-determined threshold, designating the acoustic model for use in the current speech context;

determining a language model associated with the current speech context; and processing, with the language model, one or more phonemes from the speech that is spoken in the at least one condition to generate text.

6. The method of claim 5, the determining the social graph data further comprising one or more of retrieving user data associated with the user, accessing application data from the user device, or accessing environmental data associated with the user device.

7. The method of claim 6, the user data further comprising one or more of user identity, user demographics, or a user schedule.

8. The method of claim 6, the application data comprising one or more of an application executing on the user device, an application state, or a use history of the application on the user device.

9. The method of claim 6, the environmental data comprising one or more of user device location, sensor data, ambient sound, date/time, or proximity to other users.

10. The method of claim 5, comprising:

generating an additional speech context using the social graph data, wherein the one or more previously defined speech contexts do not include the additional speech context; and designating the additional speech context as a current speech context.

11. The method of claim 5, further comprising:

designating at least one of the one or more previously defined speech contexts as a current speech context using the correspondence.

12. The method of claim 5, wherein generating the acoustic model further comprises:

generating the acoustic model using the received speech.

13. The method of claim 5, further comprising:

processing the speech that is spoken in the one or more conditions with the acoustic model to determine the one or more phonemes.

14. The method of claim 5, further comprising:

determining an additional speech context associated with the social graph data, wherein the one or more previously defined speech contexts do not include the additional speech context; and determining one or more language models associated with the additional speech context.

15. The method of claim 5, further comprising:

determining an additional speech context associated with the social graph data, wherein the one or more previously defined speech contexts do not include the additional speech context;

determining one or more language models associated with the additional speech context; and processing the speech that is spoken in the one or more conditions with the acoustic model and the one or more language models.

16. A system, comprising:

at least one memory storing computer-executable instructions and speech uttered by a user; and at least one processor configured to access the at least one memory and execute the computer-executable instructions to:

access the speech uttered by the user;

determine social graph data associated with conditions present during utterance of the speech;

determine that a correspondence of the social graph data to one or more previously defined speech contexts is below a pre-determined threshold;

when the correspondence is below a pre-determined threshold:

generating an additional speech context using the social graph data; and designating the additional speech context as a current speech context;

acquire speech waveforms over a period of time and/or until a pre-determined amount of the speech waveforms has been acquired, wherein the speech waveforms correspond to speech of one or more users that is spoken in the conditions;

generate, using the speech waveforms, an acoustic model for processing one or more waveforms representing speech that is spoken in the conditions to determine one or more phonemes, wherein the one or more waveforms are different from the speech waveforms used to generate the acoustic model;

compare accuracy of the acoustic model with accuracy of a previously stored acoustic model;

when the compared accuracy of the acoustic model reaches a pre-determined threshold, designate the acoustic model for use in a current speech context;

determine a language model associated with the current speech context; and process, with the language model, one or more phonemes from the speech that is spoken in the conditions to generate text.

17. The system of claim 16, the instructions further executable by the at least one processor to:
  determine a speech context associated with the social graph data, wherein the one or more previously defined speech contexts do not include the additional speech context;
  store the acoustic model; and
  associate the acoustic model with the additional speech context.

18. The system of claim 16, the instructions further executable by the at least one processor to:
  determine an additional speech context associated with the social graph data, wherein the one or more previously defined speech contexts do not include the additional speech context;
  determine the acoustic model associated with the additional speech context; and
  determine the one or more phonemes from the speech that is spoken in the conditions using the acoustic model.

19. The system of claim 16, the instructions further executable by the at least one processor to:
  determine an additional speech context associated with the social graph data, wherein the one or more previously defined speech contexts do not include the additional speech context;
  determine a language model associated with the additional speech context; and
  generate text from the speech that is spoken in the conditions using the language model.

20. The system of claim 16, the instructions further executable by the at least one processor to:
  determine an additional speech context associated with the social graph data, wherein the one or more previously defined speech contexts do not include the additional speech context;
  determine the one or more phonemes from the speech that is spoken in the conditions using the acoustic model;
  determine a language model associated with the additional speech context; and
  generate, from the one or more phonemes, text using the language model.

* * * * *